United States Patent Office 3,528,449
Patented Sept. 15, 1970

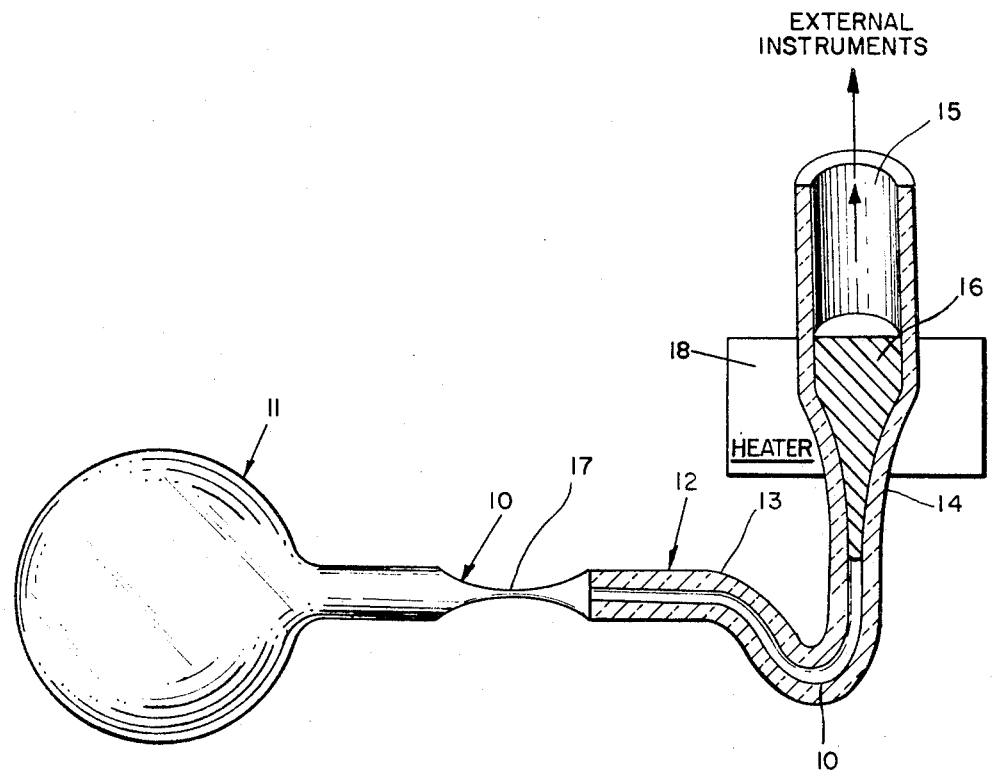

1

3,528,449
FLUID FLOW CONTROL APPARATUS
Robert S. Witte, Redondo Beach, and Charles E. Wood, Woodland Hills, Calif., assignors to TRW Inc., Redondo Beach, Calif., a corporation of Ohio
Filed Feb. 27, 1968, Ser. No. 708,617
Int. Cl. F16k 9/00
U.S. Cl. 137—251                 14 Claims

ABSTRACT OF THE DISCLOSURE

A fluid flow apparatus capable of controlling fluid flow in minute quantities. The apparatus provides an exit passage from a gas container through, in series, a Venturi-type pinched tube, a gas storage capillary tube and a valve-plug made of indium or gallium. The pinched tube allows only small quantities of gas to pass therethrough from the high pressure gas container to the capillary tube, to bubble through the indium or gallium while in a molten liquid state, and to be supplied to external equipment. When solidified the indium or gallium provides a seal maintaining gas within the capillary tube storage area.

BACKGROUND OF THE INVENTION

Field of the invention

A fluid flow control apparatus and particularly a slow flow gas apparatus combining a slow leak device with a molecular valve and a gas reservoir therebetween to discretely supply gas in small quantities and at low pressures to external equipment such as lasers.

Description of the prior art

Valves and semipermeable membranes for controlling the flow of fluids are within the present art. It is known that the application of heat to such valves or membranes will vary their capability to pass larger quantities of fluids. Consequently, control of the amount of heat applied to the valve or membrane will enable control of the molecular flow therethrough. Also, molecular flow can be controlled, to some extent, by placing a frit (porous plug) adjacent the valve to adjust the leak rate into the valve. The frit screens the flow, the amount of leak rate being determined by the size of the apertures in the frit. To reduce the leak rate through the frit it is necessary to replace the frit or to block off some of the porous apertures.

Specifically, by one present technique a fluid flow apparatus positions a valve constructed of zeolite or activated alumina in the flow path between the fluid supply and the outlet. The zeolite valve acts as a molecular sieve, allowing those molecules, comparable in size to the zeolite crystals, to pass through the crystals, and preventing larger molecules from passing. Adjusting the temperature of the zeolite crystals changes the diameter of the crystals and provides for varied molecular flow through the valve. Flow control is also provided by constructing valves from different types of zeolite having larger crystal cavities.

Another present technique provides a gas flow apparatus which passes gas from a gas supply tube through a tubular semipermeable membrane having a heating element disposed coaxially within the membrane. The temperature of the membrane controls the diffusion rate through the membrane and the material of which the membrane is constructed determines which gas molecules will be capable of permeating the membrane.

Patented or known apparatus provide means to control relatively large quantities of gas only and do not provide a means for controlling gas flow in sufficiently minute quantities as is provided in this invention, nor is there provided means for discretely supplying gas in sufficiently small quantities and at low pressures to external equipment such as lasers. Two such patents are: 3,270,756, Fluid Flow Control Valve; 3,104,960, Gas Flow Apparatus.

This invention improves upon the prior art by providing a means for controlling gas flow in smaller quantities than can be controlled presently, and by providing a means for discretely supplying the smaller quantities of gas at low pressure to external equipment such as lasers. This invention provides a unique device combining a slow leak unit with a molecular valve and a gas reservoir therebetween. Both the method of controlling gas flow in small quantities and the gas flow apparatus are subject of this invention and improve upon the prior art of fluid or gas flow apparatus.

SUMMARY OF THE INVENTION

Briefly, this invention provides a fluid flow apparatus which comprises a tube, fluid supply means, a conduit, a valve-plug and heating means. The tube has a pinched section intermediate the ends, the pinched section providing a restricted passage sufficiently narrow to allow slow leakage of molecules. The fluid supply means is connected to one end of the tube and supplies pressurized fluids through the tube. The conduit is connected to one end of the tube and is adapted to receive and pass fluids therethrough. The conduit has a reservoir section to store fluids adjacent the tube and a valve-plug section adjacent the reservoir section. The valve-plug is located within the valve-plug section of the conduit and is adapted to pass small quantities of fluids from the conduit reservoir section through the valve-plug. The heating means is for heating the valve-plug.

In accordance with one phase of this invention the fluid flow apparatus is as described above and additionally the conduit valve-section passage forms a gradual taper, the taper passage adapted to receive a valve-plug of the metal indium therein and to support the valve-plug by capillary action, the valve-plug in combination with the taper passage inner wall forming a long seal. The conduit reservoir section intermediate the tube and the taper passage forms a capillary passage having inside diameter in the order of 0.5 millimeter. The conduit is made of glass. The tube material is copper. The fluid supply means supplies argon gas through the tube.

BRIEF DESCRIPTION OF THE DRAWINGS

In the drawings:
The figure is a cross-sectional view of one embodiment of the present invention.

DESCRIPTION OF THE PREFERRED EMBODIMENT

The apparatus includes a pinched tube 10; a fluid supply means illustrated as flask 11 connected at one end of tube 10; a conduit 12 connected at the other end of tube 10 providing a continuous fluid passage between the flask 11 and conduit 12, the conduit 12 divided into a reservoir section 13 adjacent tube 10 to receive and store fluid from flask 11, a valve-plug section 14, and an exit section 15; and a valve-plug 16 within the valve-plug section 14.

The pinched tube 10 provides a restricted passage 17 for minute quantities of fluid or gas flowing through tube 10 from flask 11. Tube 10 has been successfully fabricated by pinching down a section of OFHC copper tubing in a vise. The leak rate of tube 10 was estimated by immersing one end of tube 10 in water, blowing high pressure air through the end not immersed and observing the bubble formation at the end immersed. The size of passage 17 is adjusted until the proper bubble formation is established. The proper leak rate is determined by the amount of time required for valve-plug section 14 to reseal, as described hereafter. Any other material and method of forming the restricted passage 17 of tube 10 is contemplated in this invention.

A relatively large flask 11 is connected at one end of a tube 10 to provide a source of fluid or gas. The flask 11 should be connected to tube 10 in a leak-proof manner so gas or fluid will not escape as it passes from the flask 11 to the tube 10.

A conduit 12 is connected at the other end of tube 10, also in a leak-proof manner so gas or liquid will not escape as it passes from the tube 10 to conduit 12. The conduit 12 is divided into two parts, i.e., a reservoir section 13 and a valve-plug section 14. The reservoir section 13 located adjacent to tube 10 provides a storage area for fluid or gas received from flask 11 through the tube 10. For most uses a capillary conduit having an inside diameter approximately 0.5 millimeters is saisfactory. The storable amount of gas or fluid can be varied by varying the length of the reservoir section 13 of conduit 12. The valve-plug section 14 located at one end of the reservoir section 13 provides a passage which is gradually tapered from the border of reservoir section 13 to exit 15. The taper is adapted to receive valve-plug 16 therein and in combination with valve-plug 16 to provide a long seal preventing gas or liquid from leaking along the inside walls of the valve-plug section 14. Valve-plug 16 should melt at a low temperature, have a low vapor pressure and wet glass. Heat is applied to plug 16 by heater 18. Experiment has shown indium or gallium valve-plugs 16 provide satisfactory seals when employed within a glass conduit 12. Exit 15 is adapted to be connected to external equipment such as lasers.

According to the operation of the fluid flow control valve when used to periodically recharge a laser tube with gas, heat is applied to the outside of the valve-plug section 14 melting the indium or gallium valve-plug 16. The argon gas supplied by flask 11 through slow leak tube 10 and stored under pressure in reservoir section 13 bubbles through the molten indium or gallium valve-plug 16 and passes through exit 15 to the externally connected laser tube. The rate of gas flow through plug 16 is proportional to the controlled gas pressure in the reservoir section 13. In the molten liquid state the valve-plug is maintained in the valve-plug section 14 and does not leak into the reservoir section 13 because the liquid is supported upon the capillary conduit of the reservoir section 13 and the gradual taper of section 14. Gas is prevented from leaking along the inner walls of the valve-plug section 14 by the wetting action between the valve-plug 16 and the glass wall. After a certain time or after the desired gas has passed to the laser tube, the heat is no longer applied. The valve-plug 16 cools and solidifies upon cooling, resealing the conduit passage and gas is stored again in the reservoir section 13. The leak rate of tube 10 should provide a sufficiently slow leak that an insignificant amount of gas is admitted to reservoir section 13 during the resealing time of valve-plug section 14. In connection with supplying argon gas to a laser cavity using the fluid flow control apparatus, experience shows that the valve-plug 16 requires approximately three minutes to cool and solidify and that the reservoir section should refill to approximately 0.5 atmosphere of pressure within approximately one hour. These conditions describe an insignificant amount of gas as admitted to reservoir section 13. The amount of gas would not be insignificant if the gas admitted to the reservoir section 13 during cooling of the valve-plug 16 and resealing of section 14 was passed to the laser cavity. The amount of time during which heat is applied or the amount of gas delivered or gas pressure developed can be determined by conventional measurement or sensing instruments connected to the fluid flow control valve. The device, which has no moving parts, can be recycled a large number of times and can easily be programmed to operate automatically with the aid of sensing instruments.

While certain embodiments of the invention have been described in detail herein and shown in the accompanying drawing, it will be evident that various additional modifications are possible in the arrangement and construction of its components without departing from the scope of the invention.

We claim:
1. A fluid flow apparatus comprising:
   a tube having a pinched section providing a restricted passage sufficiently narrow to allow slow leaking of molecules,
   fluid supply means connected to one end of said tube for supplying pressurized fluids through said tube,
   a conduit connected at one end of said tube adapted to receive and pass fluids therethrough, said conduit having a reservoir section to store fluids adjacent said tube and a valve-plug section adjacent said reservoir section,
   a normally solid valve-plug located within and sealing the valve-plug section of said conduit, said valve-plug adapted to liquefy upon heating and in said liquid state to pass small quantities of fluids from the conduits reservoir section through the valve-plug, and
   means for heating said valve-plug.

2. A fluid flow apparatus as in claim 1 wherein the conduit defines a capillary conduit.

3. A fluid flow apparatus as in claim 1 wherein the conduit valve section passage forms a gradual taper, said taper passage adapted to receive and nest said valve-plug therein and to support the valve-plug while in liquid state by capillary action.

4. A fluid flow apparatus as in claim 3 wherein the conduit passage intermediate said tube and said taper passage forms a capillary passage.

5. A fluid flow apparatus as in claim 4 wherein the capillary passage defines a passage having inside diameter in the order of 0.5 millimeter.

6. A fluid flow apparatus as in claim 4 wherein the substance of the valve-plug defines a substance having a low vapor pressure, glass wetting capabilities and a low melting point, said plug substance in combination with said taper passage inner wall forming a long seal.

7. A fluid flow apparatus as in claim 6 wherein the valve-plug substance defines the metal indium.

8. A fluid flow apparatus as in claim 6 wherein the valve-plug substance defines the metal gallium.

9. A fluid flow apparatus as in claim 6 and further comprising: a noble gas contained within and to be supplied by the fluid supply means.

10. A fluid flow apparatus as in claim 9 wherein argon gas defines the noble gas.

11. A fluid flow apparatus as in claim 9 wherein the open-end of said conduit adjacent the valve-plug section is connected to external instruments.

12. A fluid flow apparatus as in claim 9 wherein the conduit defines a glass conduit.

13. A fluid flow apparatus as in claim 12 wherein the tube defines a malleable material.

14. A fluid flow apparatus as in claim 13 wherein copper forms the tube material.

References Cited
UNITED STATES PATENTS

| | | | |
|---|---|---|---|
| 2,717,032 | 9/1955 | Dupin | 137—74 XR |
| 2,771,900 | 11/1956 | Dayton | 137—251 |
| 2,942,615 | 6/1960 | Dayton | 137—74 XR |
| 3,270,756 | 9/1966 | Dryden | 137—13 |
| 3,270,773 | 9/1966 | Brunnée | 251—118 XR |

ROBERT R. MACKEY, Primary Examiner

U.S. Cl. X.R.

137—334; 251—368